United States Patent [19]
Stepanek

[11] Patent Number: 5,746,865
[45] Date of Patent: May 5, 1998

[54] PROCESS FOR TRANSFERRING HOLOGRAPHIC IMAGES

[75] Inventor: Stephen B. Stepanek, Amherst, N.H.

[73] Assignee: Hampshire Holographic Manufacturing Corp., Milford, N.H.

[21] Appl. No.: 655,000

[22] Filed: Jul. 9, 1996

[51] Int. Cl.$^6$ .................................................. B44C 1/165
[52] U.S. Cl. .................... 156/233; 156/247; 156/277; 156/240; 156/249
[58] Field of Search .................... 156/234, 235, 156/237, 239, 240, 249, 244.17, 246, 260, 321, 277, 231, 233, 222; 264/1.3, 1.4, 226, 283, 293, 227

[56] References Cited

U.S. PATENT DOCUMENTS

| | | | |
|---|---|---|---|
| 4,758,296 | 7/1988 | McGrew | 156/231 |
| 4,856,857 | 8/1989 | Takeuchi et al. | 350/3.6 |
| 4,906,315 | 3/1990 | McGrew | 156/231 |
| 5,083,850 | 1/1992 | Mallik et al. | 359/1 |
| 5,300,169 | 4/1994 | Tahara | 156/230 |
| 5,342,672 | 8/1994 | Killey | 428/195 |
| 5,499,117 | 3/1996 | Yin et al. | 359/3 |
| 5,517,336 | 5/1996 | Molee | 359/1 |
| 5,521,030 | 5/1996 | McGrew | 430/1 |
| 5,619,377 | 4/1997 | Rallison | 359/631 |
| 5,643,678 | 7/1997 | Boswell | 428/467 |

*Primary Examiner*—Merrick Dixon
*Attorney, Agent, or Firm*—Stephen W. White

[57] ABSTRACT

A process for transferring a holographic image from a conventional polymeric support to a foil support is described in this invention. A host of images may be envisioned and since this image, on a foil support, may then be wound up in a roll, it can be used as a wrapping element for a host of applications such as in the candy and gum industry; wrapping foils; etc. This element and process permits the wide spread use of such holographic images, such use not being available until now.

8 Claims, 2 Drawing Sheets

PROCESS FOR TRANSFERRING HOLOGRAPHIC IMAGES

CROSS-REFERENCE TO RELATED APPLICATIONS

This application is related to assignee's issued U.S. Pat. No. 4,662,986, Sep. 2, 1997 and to co-filed U.S. Ser. No. 08/679,349, allowed on Sep. 4, 1997.

BACKGROUND OF THE INVENTION

1. Field of the Invention

This invention relates to holographic images formed by a unique process for various security and decorative purposes. Also, this invention relates to aluminized roll-stock holographic images formed on a plastic layer. Further, this invention relates to elements and process for transferring holographic images to yet another substrate. Still further, this invention relates to a unique process for transferring holographic images to a relatively inexpensive substrate which permits a wide-spread use of said holographic image.

2. Description of the Prior Art

Holographically enhanced materials are well known in the prior art. These are usually made by very proprietary methods which includes passing a layer of plastic, for example, through a machine which imparts a variation (e.g. which can be an image itself) within covering or upper strata of the plastic layer. This step is somewhat similar to, but not exactly the same, as embossing. A powdered metallic element (e.g. aluminum) is then applied thereon by the so-called metallizing process. After this step, the element appears to have a holographic or 3-dimensional image imparted on the layer of plastic. This image is extremely pleasing and is widely used within the credit card and security industries, for example, to impart an image particular to that credit card or security element thereon. The resulting image is difficult to duplicate and thus these elements assist in the prevention of fraud by counterfeiting, for example. The draw-back to the use of these images is the cost since the machines to produce the image are complicated and costly in and of themselves. Additionally, holographic elements produced by this method (the so-called "shim" "method") are usually small in size and thus cannot be imprinted with larger images. Thus, this material has not been widely used outside of the credit card and novelty industry.

Within the food packaging industry it is known use foils and the like for the wrapping of individual food pieces, for example. Sometimes, these foils are embossed with decorative or advertising logos and materials. In addition, it is known in this industry to laminate with glues metallized materials to tissue like paper tissues for the wrapping of individual food pieces such as candies, gums and the like, for example.

Recently, a process for making large sheets of holographically enhanced material has been developed. Thus, the costs of such holographically enhanced material have been significantly reduced. However, these large sheets of material are usually placed on a plastic surface which is also rather expensive and thus the use of this material is still rather limited. If the holographic image could be further transferred to yet another substrate, one which was less expensive and one which had higher utility (e.g. thin foils and the like), the use of such holographically prepared images would find wider use in decorative wrappings and in advertising, for example.

SUMMARY OF THE INVENTION

It is an object of this invention to provide a holographic image that can be transferred to another substrate. It is a further object to utilize a unique transferring process that can place a holographic image directly on a less expensive foil substrate, for example. These and yet other objects are achieve in a thin foil-like wrapping element, said wrapping element having a holographic image having imparted thereto by laminating to a thin foil-like wrapping substrate a holographic image on a polymeric substrate under elevated temperatures and pressure and subsequently delaminating said thin foil-like wrapping substrate from said polymeric substrate.

In yet another embodiment, this invention may be achieved in a process for transferring a holographic image to a foil substrate by laminating a holographic image, said image having been imparted on a polymeric substrate, to said foil substrate at a temperature greater than 35° C. and a pressure greater than 1 pound per square inch and subsequently delaminating said foil substrate from said polymeric substrate, whereby said holographic image is transferred to said foil substrate.

DETAILS OF THE INVENTION

Figure 1:
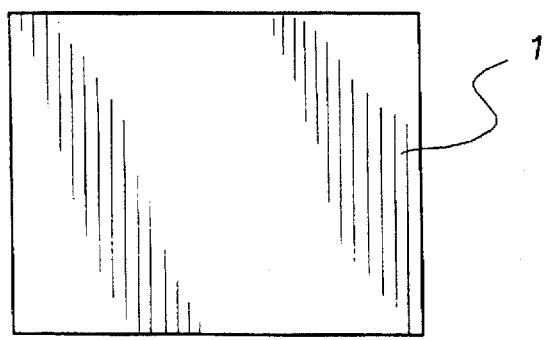
FIG. 1 is a top view of an actual prior art holographic image prepared by the process described above and contained on a polymeric substrate.

Looking now specifically at the drawings which schematically show the holographic image which is transferable from a polymeric substrate to a more useable foil substrate, FIG. 1 is a top view of an actual holographic image 1 contained on a polymeric substrate. The image has that 3-D holographic look that is well-known in the prior art, especially in the security art field.

Figure 2:
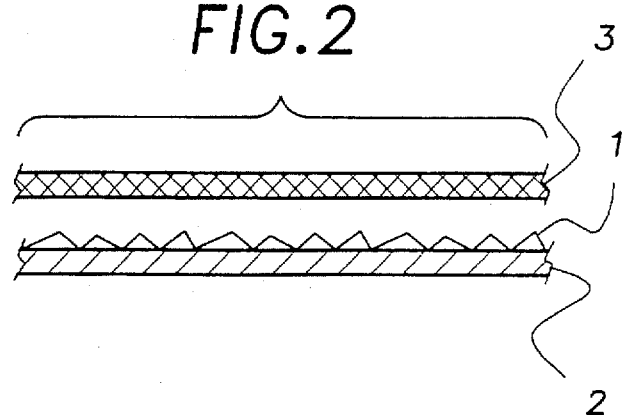
FIG. 2 is a drawing of a side view of FIG. 1. A foil substrate is shown directly above the holographic image which is contained on a polymeric substrate in this Figure.

In FIG. 2, a side view drawing of the holographic image 1 from FIG. 2 is shown. In this figure, the polymeric substrate on which the holographic image is manufactured, is shown as 2. A foil substrate 3 is shown located directly above the image.

Figure 3:
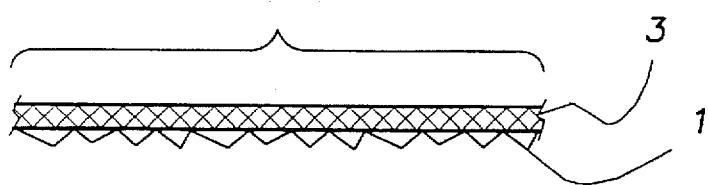
FIG. 3 is a drawing of a side view of a holographic image that has been transferred from the element of FIG. 1 directly to the foil substrate of FIG. 2

In FIG. 3, the holographic image 1 has been transferred to the foil substrate 3.

Figure 4:
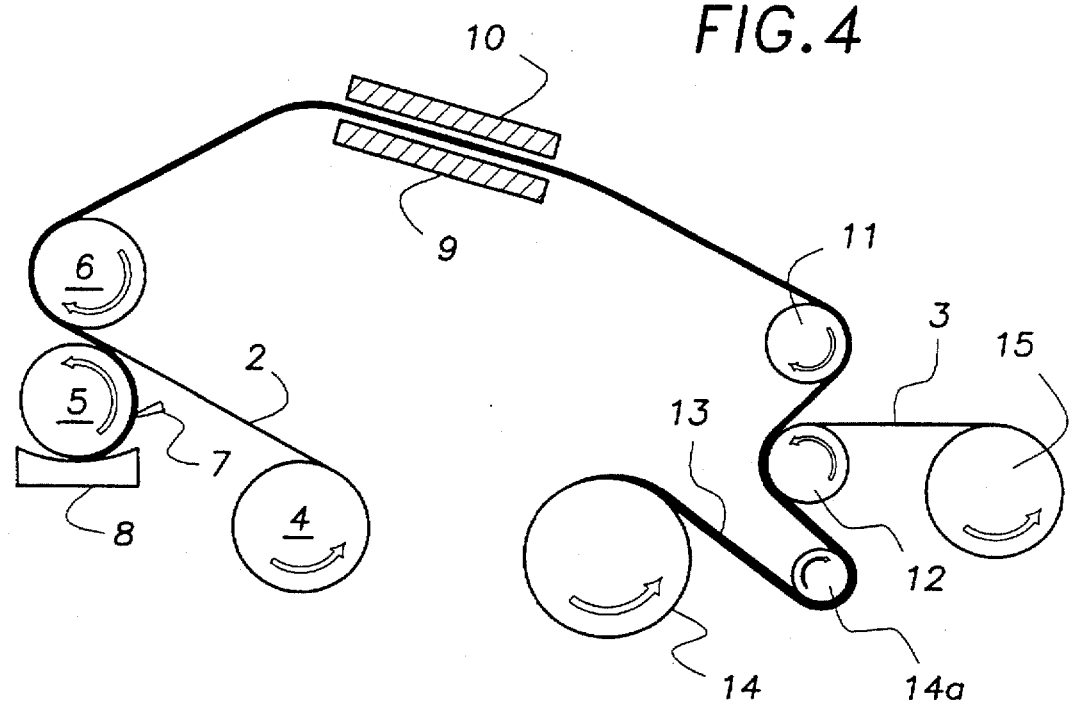
FIG. 4 is a drawing of a schematic process for the lamination of a prior art polymeric substrate containing a holographic image to a foil substrate.

FIG. 4 is a schematic drawing representing a novel process of this invention for the transfer of a holographic image from a polymeric substrate to a foil substrate. In this figure, a holographic image 1 on a polymeric substrate 2 is shown being pulled off an unwind roll 4 in a nip formed by opposing rollers 5 and 6. In this view, roll 5 is a standard gravure coating roll and roll 6 is a backup roll. A reverse gravure doctor blade (to control coating weight) is shown as 7 and a coating pan (holding a standard adhesive solution) is shown as 8. The coated holographic image on a polymeric substrate is then carried through a drier which is indicated as 9 and 10 and subsequently down to heated rolls 11 and 12. In the nip formed by these last two rolls, a foil substrate 3 taken from a roll 14 contacts the surface of the adhesive containing side of the dried, holographic image 1 contained on a polymeric substrate 2 and is laminated thereto. The heated rolls activate the dried adhesive in order to permit such a lamination to occur. The resulting sandwich 13 is passed over a chill roll 14a and then taken up by rewind roll 14.

Figure 5:
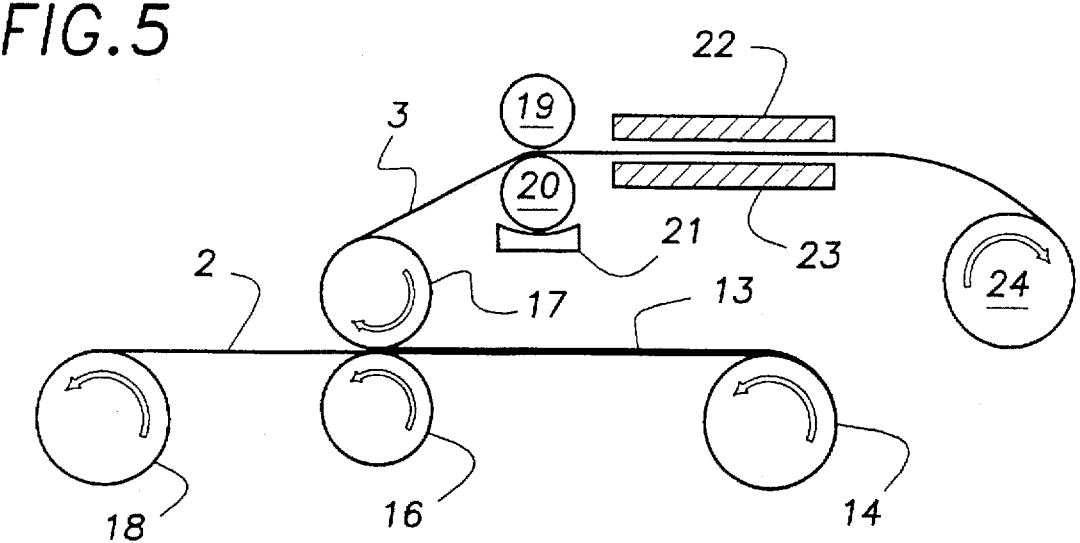
FIG. 5 is a drawing of a schematic process of direct delamination of the polymeric substrate from the foil substrate to produce the holographic image of FIG. 2 directly on the foil substrate.

The process of delamination is shown in FIG. 5. In this schematic drawing, the laminated sandwich material 13 is drawn off unwind roll 14 and taken through the nip of two delamination rolls 16 and 17. The polymeric substrate 2 is then taken up on a film rewind roll 18 (this material can subsequently be reused and recycled). The foil substrate 3 now carrying the holographic image 1 thereon is taken up to coating heads 19 and 20. A protective layer is applied over the holographic image contained on this foil substrate in order to protect this image during handling. This may be applied at the nip of the coating heads and a pan 21 is graphically shown in this view. The holographic image on the foil substrate is then carried into another drier to insure that the protective coating is hardened prior to be rolled up on to a final roll 21. The roll of holographically imaged foil is now ready for use as a wrap for food products and the like.

Figure 6:
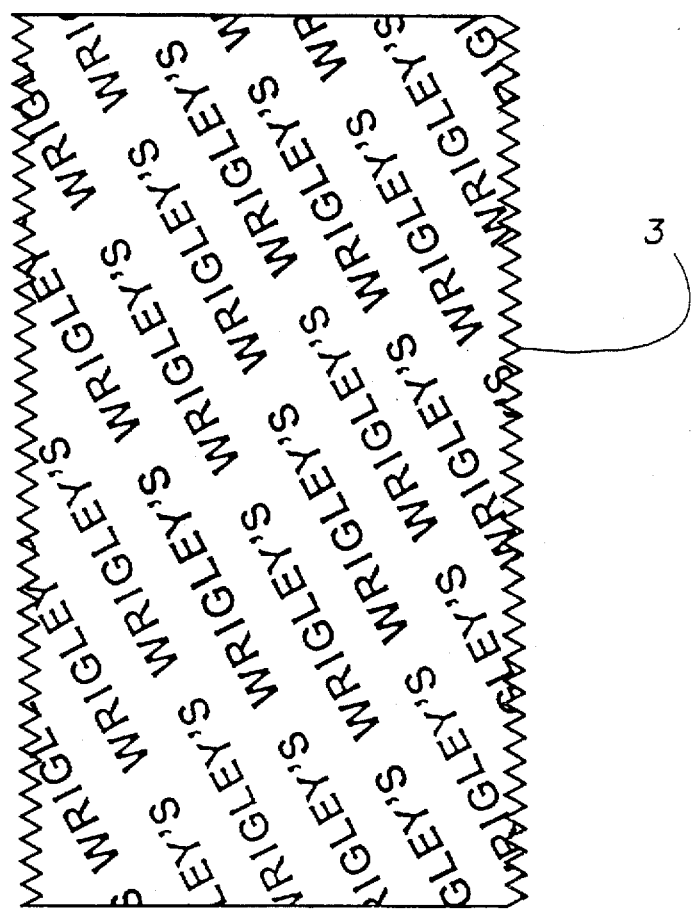
FIG. 6 is a top view of a drawing showing a name brand as a holographic image on a foil substrate, said holographic image having been transferred from a polymeric substrate. A series of these images may be prepared and rolled up so that this holographic image can be used to wrap and advertise in a flashy method.

In FIG. 6, a top view of a typical foil substrate 3 having a name brand applied in a holographic image is shown. This holographic image (seen here as "Wrigleys") was originally manufactured on a polymeric substrate in a conventional manner and then transferred to the foil substrate 3 in a manner described in FIGS. 4 and 5. This permits the wide-spread use of a holographic advertisement on a product such as a stick of gum. The holographic image, transferred to the foil substrate, is flashy and eye catching and this is the first such use thereof.

Although a temperature greater than 35° C. can be used, I prefer temperatures of 35 to 125 degrees and more preferably at temperatures of between 60 to 90 degrees at the nip of the lamination process of this invention. At the same time, an elevated pressure is applied to the nip to cause the two substrates, with the holographic image sandwiched between, to be laminated together. A pressure greater than 1 pound per square inch and up to 1,000 pounds per square inch may be used, although I prefer 5 to 10 pounds per square inch.

It is most important that the temperature of any step of this process not be greater than 150° C. in order not to harm or deform the holographic images in any way. Looking again at FIG. 4, the conditions in the drier should be such that the surface of the polymeric substrate 2 carrying the holographic image 1 and a layer of adhesive material, be somewhere between 35 and 150 degrees centigrade and most preferably 60 to 90 degrees centigrade. One can design a drier which has a proper length and can emanate the proper degree of heat to match up with the web speed which is passing through this drier. The heated nip also should have a temperature of between 25 and 150 degrees C. The purpose of the chill roll 14a is to set up the adhesive and insure that the foil substrate 3 and holographic image 1 on the polymeric substrate 2 is secured. The adhesive material is well-known in the coating art and can be applied at a coating weight of between 0.5 to 8 pounds (dry) per ream of foil, wherein a ream is 500 sheets of foil of 24 inches by 36 inches in size, and can be applied either to the foil substrate or to the holographic image layer. Within the drawings which make up some of the best modes as envisioned at the time of filing of this invention, the adhesive layer is shown being applied to the holographic image first. Then, the foil substrate contacts this layer at the heated nip rolls and is adhered thereto.

The protective layer that is applied over the top of the holographic image that has been transferred to the foil substrate by delamination, as shown in FIG. 5, can be any of a host of conventional materials such as solvent or water based acrylics, for example. This protective layer may be colored or tinted to provide additional features, for example.

I can use a host of foil substrates within the metes and bounds of this invention. For example, aluminum foils of 0.00020 to 2.0 mils in thickness are particularly useful. These foils are well-known in the food industry and are widely used to wrap up gums, candies, chocolate bars and the like. In addition to having the novel holographic image of this invention imparted thereon, these elements may also have other advertisements and writing imparted on the surface by conventional methods.

The conventionally holographically imaged polymeric substrates include many of the commonly available plastics, for example. These will include polyethylenes, polypropylenes, polyethylene terephthalates, among others, for example. These substrates are usually 0.03 to 4.0 mils in thickness.

The foil substrates on which the holographic images have been transferred may be used in a host of applications including the wrapping of candies and gums; gifts; store wrappings; decorative wrappings; etc. The holographic image may be altered for the use desired. Advertising and decorative images are also envisioned within this invention. Such applications will find wide use within the various industries that employ wrappings of this sort.

The ability to dry-bond laminate and then to delaminate the elements described within this invention represents a unique process since it was not widely known that holographic images could be so transferred. The process as described above uses some unique equipment that is designed to hold, laminate and then delaminate some fairly flimsy material. It is necessary to insure that all of the elements of the process are carefully maintained within processing limits. The use of elements produced within the scope of this invention greatly increases the utility of holographic images within a broader scope. This means that holographic images with larger images, images that can utilize advertising and logos and the like, are now possible.

I claim:

1. A process for transferring a metallized holographic image from a polymeric substrate to a foil substrate comprising the steps of:
   a. contacting said holographic image on said polymeric substrate to an adhesive and drying said adhesive on said holographic image at a temperature not greater than 150° C.;
   b. contacting said dried adhesive containing holographic image on said polymeric substrate to said foil substrate at a temperature greater than 35° C. and a pressure greater than 1 pound per square inch; and,
   c. delaminating said laminate whereby said holographic image is transferred from said polymeric substrate to said foil substrate.

2. The process of claim 1 wherein said laminating temperature is between 35° and 150° C. and said pressure is between 1 and 1,000 pounds per square inch.

3. The process of claim 2 wherein said laminating temperature is between 60° and 900° C. and said pressure is between 5 and 10 pounds per square inch.

4. The process of claim 1 wherein said foil substrate has a thickness of between 0.00020 and 2.0 mils.

5. A process of claim 1 wherein said foil substrate containing said transferred holographic image is a food wrapping element and said holographic image contains writing therein.

6. The process of claim 5 wherein said writing is in the form of a logo.

7. The process of claim 1 wherein said foil substrate containing said transferred holographic image is a gift wrapping element and further wherein said holographic image contains writing thereon.

8. A process for transferring a metallized holographic image from a polymeric substrate to a thin tissue substrate, wherein said thin tissue substrate has a thickness of between 0.00020 to 2.0 mils, comprising the steps of;

a. contacting said holographic image on said polymeric substrate to an adhesive;

c. drying said adhesive containing holographic image on said polymeric substrate by passing said substrate through an oven at a rate of speed so that the temperature of said substrate does not exceed 150° C.;

d. contacting said dried, adhesive containing holographic image on said polymeric substrate with said foil substrate at a temperature of between 35° and 150° C. and a pressure of 1 to 1,000 pounds per square inch to form a laminate;

e. cooling said laminate below 25° C.;

f. delaminating said laminate whereby said holographic image is transferred to said foil substrate;

g. overcoating said holographic image on said foil substrate with an overcoat; and h. drying said overcoated holographic image on said foil substrate.

\* \* \* \* \*